United States Patent
Maeda et al.

(10) Patent No.: US 9,789,402 B2
(45) Date of Patent: Oct. 17, 2017

(54) GAME DEVICE, MUSIC PLAYBACK DEVICE, AND RECORDING MEDIUM

(71) Applicant: CAPCOM Co., Ltd., Osaka (JP)

(72) Inventors: Naoki Maeda, Osaka (JP); Yuki Urabe, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 45 days.

(21) Appl. No.: 14/893,803

(22) PCT Filed: May 29, 2014

(86) PCT No.: PCT/JP2014/064273
§ 371 (c)(1),
(2) Date: Nov. 24, 2015

(87) PCT Pub. No.: WO2014/196443
PCT Pub. Date: Dec. 11, 2014

(65) Prior Publication Data
US 2016/0121217 A1    May 5, 2016

(30) Foreign Application Priority Data

Jun. 3, 2013  (JP) ................. 2013-116932

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/63 | (2014.01) |
| G10H 1/18 | (2006.01) |
| A63F 13/54 | (2014.01) |

(Continued)

(52) U.S. Cl.
CPC ............ *A63F 13/63* (2014.09); *A63F 13/533* (2014.09); *A63F 13/54* (2014.09); *A63F 13/814* (2014.09);
(Continued)

(58) Field of Classification Search
CPC ........ A63F 13/63; A63F 13/533; A63F 13/54; A63F 13/814
See application file for complete search history.

(56) References Cited

U.S. PATENT DOCUMENTS

2001/0012795 A1    8/2001  Asami et al.

FOREIGN PATENT DOCUMENTS

| | | |
|---|---|---|
| JP | 2001-359184 A | 12/2001 |
| JP | 3746875 B | 2/2006 |

(Continued)

OTHER PUBLICATIONS

Mario Party 9, Mar. 11, 2012, Nintendo, https://en.wikipedia.org/wiki/Mario_Party_9.*

(Continued)

*Primary Examiner* — Kevin Y Kim
(74) *Attorney, Agent, or Firm* — IP Business Solutions, LLC

(57) ABSTRACT

According to the present invention, in response to the change of the menu hierarchy, it is possible to diversify the BGM easily. First, BGM 1, BGM 2, and BGM 3 (hereinafter the BGM 1, 2, and 3) that are the same piece of music performed with different sounds are played back simultaneously. Only the volume of the BGM 1 is turned up and the volume of the BGM 2 and 3 are turned down to mute. Next, in response to the change of the menu hierarchy, the volume of the BGM 1 is muted and the volume of one of the muted BGM 2 or 3 is turned up.

3 Claims, 3 Drawing Sheets

(51) Int. Cl.
   G10H 1/24       (2006.01)
   G10H 1/46       (2006.01)
   A63F 13/814     (2014.01)
   A63F 13/533     (2014.01)

(52) U.S. Cl.
   CPC .............. G10H 1/18 (2013.01); G10H 1/24 (2013.01); G10H 1/46 (2013.01); *G10H 2210/026* (2013.01)

(56) References Cited

FOREIGN PATENT DOCUMENTS

| | | |
|---|---|---|
| JP | 2010-17402 A | 1/2010 |
| KR | 20010078346 A | 8/2001 |

OTHER PUBLICATIONS

Mario Party 9 Main Menu Theme Transition, Mar. 21, 2012, https://www.youtube.com/watch?v=FL6iva1-Fol.*

Mario Party 9—Solo Mode Walkthrough Part 1—Toad Road, published Aug. 24, 2015 (game itself released in 2012), https://www.youtube.com/watch?v=P35vxucfpK0.*

Main Menu Medley—Mario Party 9, published Jan. 3, 2016 (game released in 2012), https://www.youtube.com/watch?v=ojLnE85D-q8.*

Korean Office Action dated Nov. 21, 2016 in the counterpart Korean application.

The Jeff Sengstack, "Adobe Audition—Mixing and applying effects to clips in a multitrack session," Youtube.com, [online], Nov. 2, 2011, [Nov. 18, 2016 search], and the internet: <URL: https://www.youtube.com/watch?v=bXG17RjLF9Y>.

* cited by examiner

BGM1
(Basses)

BGM1
(Basses and drams)

BGM1
(Basses, drams, and a piano)

GAME DEVICE, MUSIC PLAYBACK DEVICE, AND RECORDING MEDIUM

FIELD OF THE INVENTION

Technical Field

The present invention relates to game music playback technique.

Background of the Invention

Game music is one of the significant elements for the game.

The game music can liven up the game by outputting appropriate music at various scene in the game.

In Japanese Patent No. 3746875, it is described an invention that the number of sounds and the number of performance parts of the music are increased in response to achievement of the game such as obtained points.

Users often select some menu items such as difficulty and stage on the menu screen before the game starts. Music is output on the menu screen as well; however the music played back on the menu screen is just back ground music (BGM). When the menu screen is configured with a plurality of hierarchies, different music may be output for each of the hierarchies. The present inventors find that lower or higher of the hierarchies (hierarchy levels) of the menu screen is distinguished with music by increasing the number of performance parts performed with different or the same instruments in response to the hierarchies before the game starts, and then the music can liven up users.

However, according to the technique described in Japanese Patent No. 3746875, the number of the performance parts is increased, and each of the performance parts are simultaneously played back so that the volume of music is changed depending on the number of the performance parts. When the number of the performance parts is small, the volume should be set larger. When the number of the performance parts is large, the volume should be set smaller. It is impossible to play back the music in appropriate volume by merely increasing the number of the performance parts.

As illustrated in FIG. 5 in Japanese Patent No. 3746875, the number of the performance parts is increased or decreased after finishing the phrase of a piece of music. According to Japanese Patent No. 3746875, when the user accesses to the lower hierarchy, the number of the performance parts of the piece of music will be changed after finishing the phrase of the piece of music even though the user accesses to the lower hierarchy regardless of the phrase of a piece of music. Such method as calculating a playback position of the music when the menu hierarchy is changed and starting playback of added performance parts from the playback position may be considered. However, the simpler process is preferable to complicated process, because resources are limited to the potable game console.

SUMMARY OF THE INVENTION

Thus the present invention diversifies the game music in simple method.

A game device relating to the present invention, the game device comprising: a music storage unit storing a plurality of music tracks being the same piece of music performed in an individual combination of various sounds including at least one sound; a music playback unit turning down the volume of the plurality of music tracks except for a first music track and simultaneously starting playback of the plurality of music tracks; and a switch unit switching music tracks in response to operation input on a game screen by a user by turning down the volume of the first music track and turning up the volume of a second music track being one of the plurality of music tracks that had been turned down its volume.

DESCRIPTION OF EMBODIMENTS

Hereinafter, it will be described one embodiment of the present invention with reference to the drawings.

Figure 1:
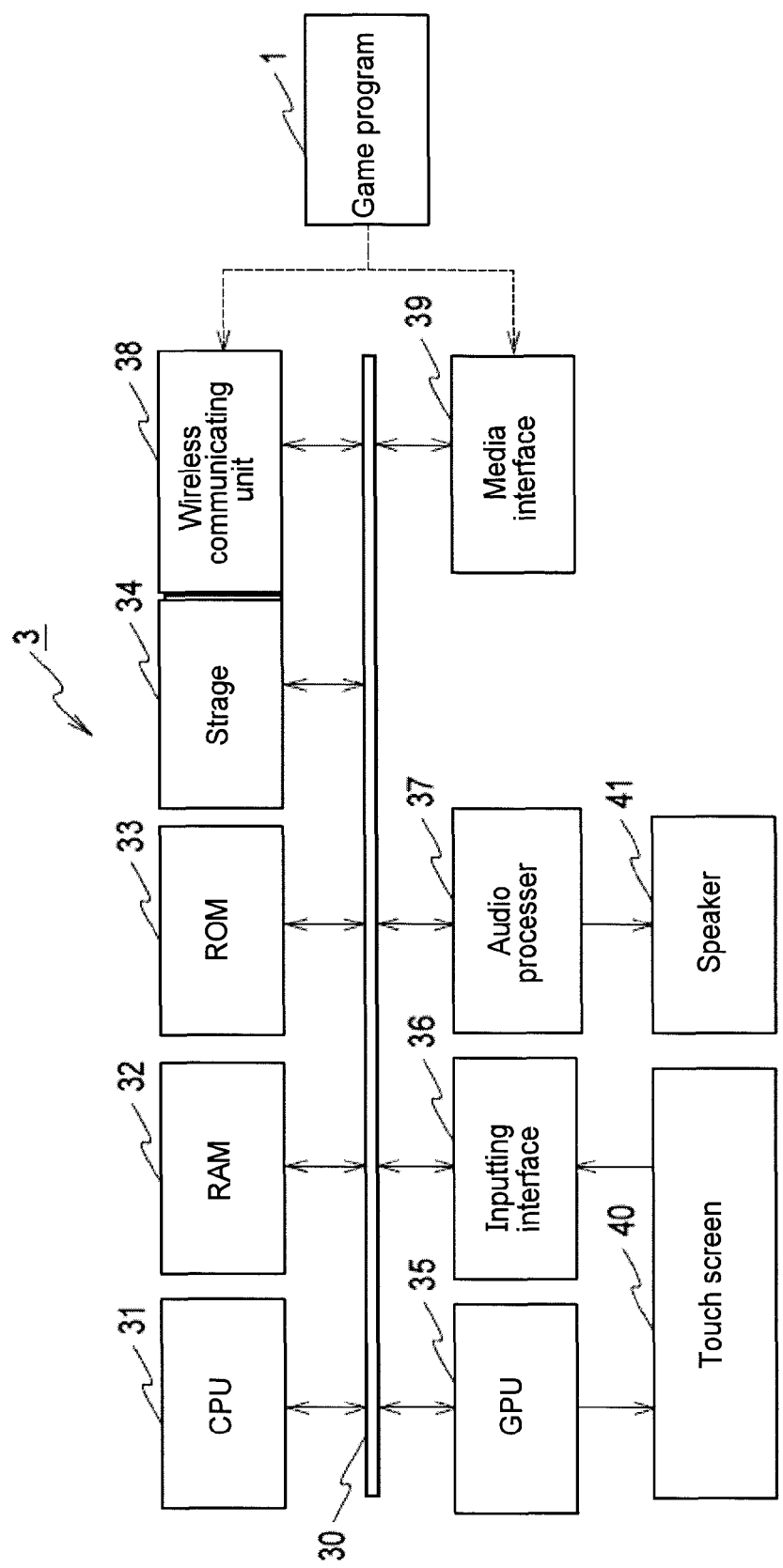
FIG. 1 is a block diagram of configuration in a game console executing a game program according to one embodiment of the present invention.

FIG. 1 is a block diagram of configuration in a game console 3 executing a game program 1 according to one embodiment of the present invention.

The game console 3 is connected to a Central Processing Unit (CPU) 31, a Random Access Memory (RAM) 32, a Read Only Memory (ROM) 33, a storage 34 (a music storage unit), a Graphic Processing Unit (GPU) 35, an inputting interface (input I/F) 36, an audio processor 37 (a music playback unit and a switch unit), a wireless communicating unit 38, and a media interface (media I/F) 39 via bus 30. The GPU 35 and the input I/F 36 are connected to a touch screen 40. The touch screen 40 displays a game screen processed by the GPU 35 and sends a touch coordinate that is calculated based of the position where the user has touched on the touch screen 40 to the input I/F 36. The audio processor 37 is connected to a speaker 41. The speaker 41 outputs audio such as sound effects and the BGM (music tracks) converted and amplified to analog signal by audio processor 37. For example, as the game console 3, a smartphone with the touch screen 40 may be applicable.

The game console 3 stores a game program 1 received from the wireless communicating unit 38 or the media I/F 39 to the storage 34. The CPU 31 is included in a game device that will be detailed later with the hardware resources described above. The CPU 31 loads the game program 1 stored in the storage 34 onto the RAM 32 and executes the game program 1. The game program 1 is able to be stored on a storage medium such as a magnetic disk, an optical disk, and a semiconductor memory. Also the game program 1 is able to be provided through a network.

Subsequently, it will be described that the function provided by the game program 1 according to one embodiment of the present invention.

Embodiment 1

The storage 34 in the game console 3 executing the game program 1 of Embodiment 1 previously stores BGM 1, BGM 2, and BGM 3 (hereinafter the BGM 1, 2, and 3) that are the same piece of music performed with different number of sounds (performance parts). For example, the BGM 1 is performed with only basses, the BGM 2 is performed with basses and drums, and the BGM 3 is performed with basses, drums, and a piano. The BGM 1, 2, and 3 are stored for the menu screen.

Hereinafter, one embodiment of the menu screen on which the user selects menu items will be described from FIG. 2A to FIG. 2C. Switching audible music corresponding to the menu hierarchy will be described with FIG. 3.

Figure 2A:
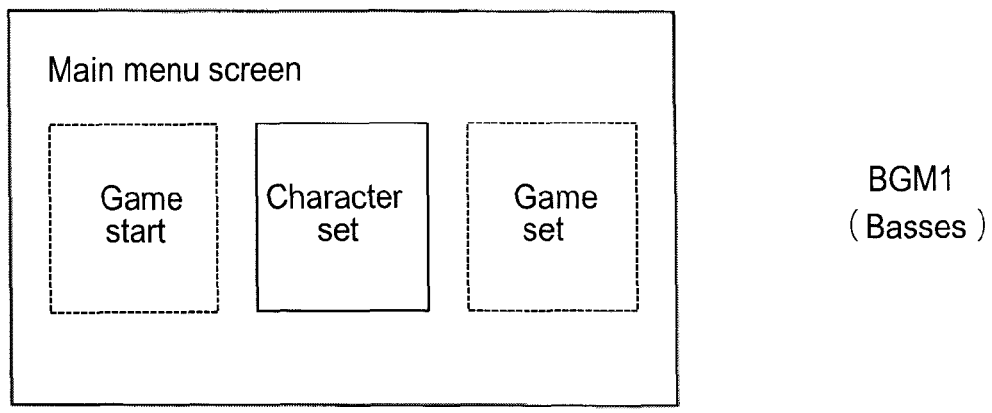
FIG. 2A is a main menu screen according to one embodiment of the present invention.
Figure 2B:
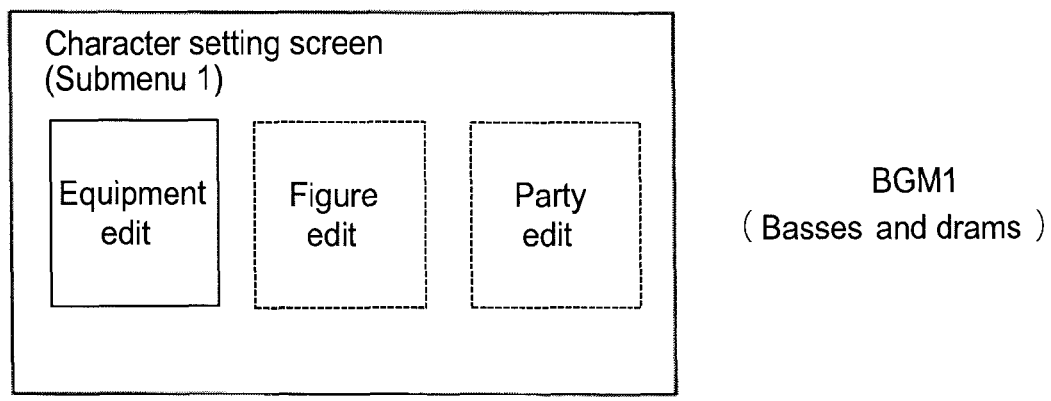
FIG. 2B is a character setting screen according to one embodiment of the present invention.
Figure 2C:
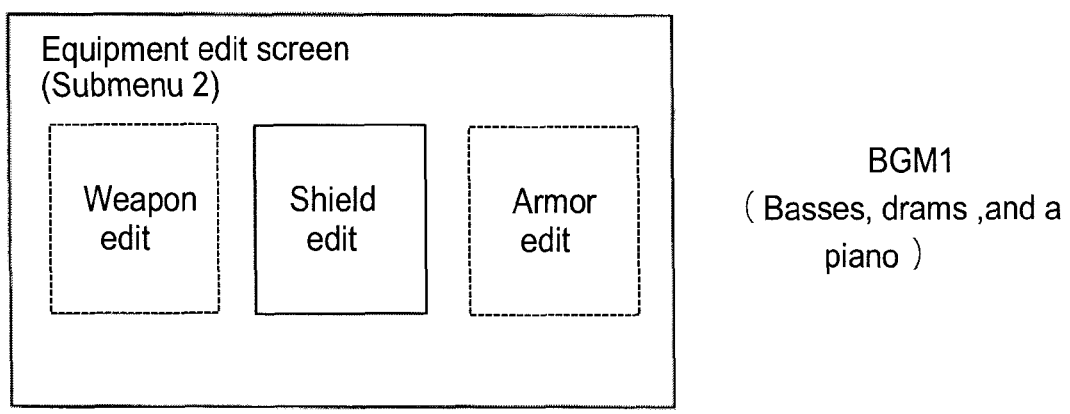
FIG. 2C is an equipment edit screen according to one embodiment of the present invention.
Figure 3:
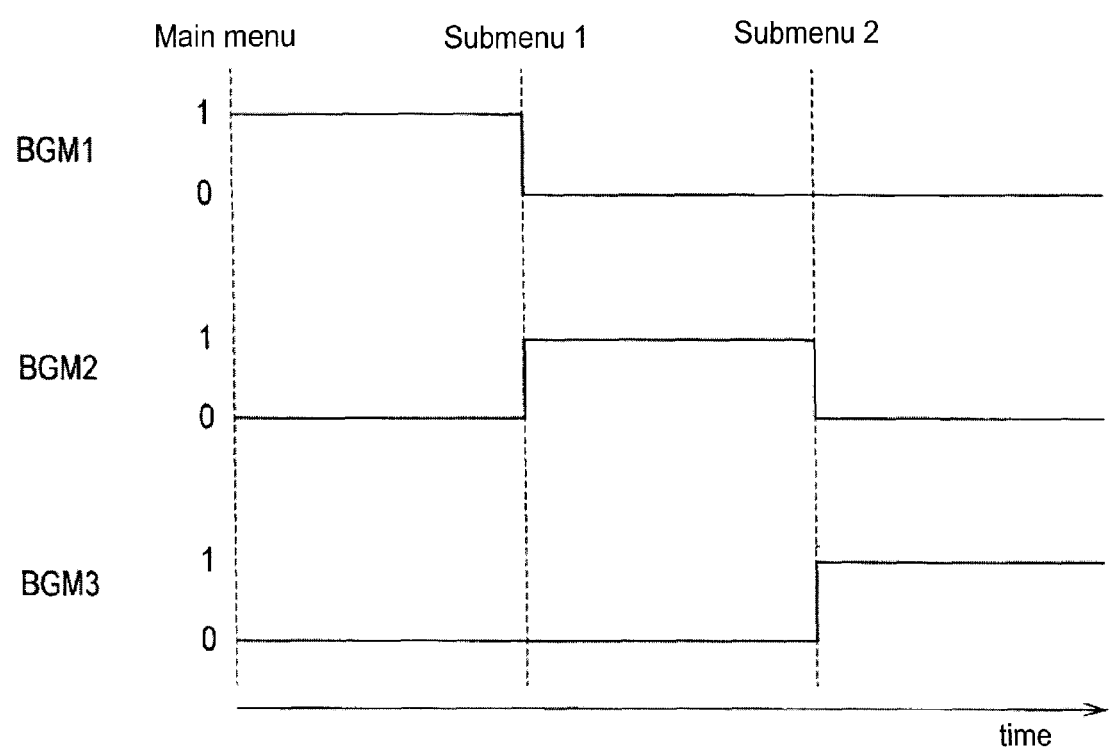
FIG. 3 is a view switching audible music.

First, the main menu screen illustrated in FIG. 2A is displayed. The main menu screen includes selectable three menu items such as "game start", "character setting", and "game setting". When the main menu screen is displayed, the audio processor 37 calls all BGM 1, 2, and 3 that is the same piece of music performed with different number of sounds, and simultaneously starts playback of all BGM 1, 2, and 3 from the beginning (the same position). As illustrated in FIG. 3, when the main menu screen is displayed, the audio processor 37 turns up only the volume of the BGM 1 and turns down the volume of the BGM 2 and 3 to mute, so that only the BGM 1 performed with only the basses will be audible. In other words, all BGM 1, 2, and 3 are played back simultaneously; however, the user can only hear the BGM 1, because the volume of the BGM 2 and 3 is turned down. At this time, the audio processor 37 may play back the BGM 2 and 3 at minimum volume not to disturb the BGM 1.

Submenu 1 in response to the selected main menu item in the lower hierarchy of the main menu will be displayed when the user selects any of the main menu items on the main menu screen. In FIG. 2A, the user has selected the "character setting", then the character setting screen illustrated in FIG. 2B will be displayed. On the character setting screen, three items; "equipment edit", "figure edit", and "party edit", can be selected. As illustrated in FIG. 3, when the main menu screen is switched to the character setting screen, the audio processor 37 turns down the volume of the BGM 1 and turns up the volume of the BGM 2. At this time, the audio processor 37 turns up the volume of the BGM 2 to the same volume level of the BGM 1 being used to be audible at the main menu. Therefore, the BGM 2 performed with basses and drums instead of the BGM 1 performed with basses will be audible. The BGM 1 and 2 are the same piece of music but the number of sounds (number of performance parts) is different. The number of sounds of the BGM 2 is larger than the BGM 1. The user can hear the BGM 2 not from the beginning but naturally from a note turning down the volume of the BGM 1. The audio processor 37 does not stop playback of the BGM 1 but continues playback of the BGM 1 being turned down its volume instead. The audible BGM will be naturally switched without getting extremely large volume and without making the user feel uncomfortable even audible BGM is switched from the BGM 1 to the BGM 2, since the BGM 1, 2, and 3 are previously adjusted its volume at the same volume level.

The submenu 2 (equipment edit screen) corresponding to the selected submenu items on the submenu 1 (character setting screen); the submenu 2 being in the lower hierarchy of the submenu 1, will be displayed when the user selects any of the submenu items displayed on the submenu 1. The equipment edit screen in FIG. 2C will be displayed after the user has selected "equipment edit" on the character setting screen in FIG. 2B. The equipment edit screen includes three items "weapon edit", "shield edit", and "armor edit". As illustrated in FIG. 3, when the game screen has switched from the character setting screen (submenu 1) to the equipment edit screen (submenu 2), the audio processor 37 turns down the volume of the BGM 2, and turns up the volume of the BGM 3. Therefore, the BGM 3 performed with basses, drums, and a piano will be audible. The BGM 3 is the same piece of music as the BGM 1 and 2; however the BGM 3 has different number of sounds from the BGM 1 and 2. The sounds of the BGM 1, 2, and 3 gradually increase in number in numerical order. The user can hear the BGM 3 not from the beginning but naturally from a note turning down the volume of the BGM 2.

When the menu hierarchy turns back to the upper hierarchy, the audio processer 37 switches the BGM corresponding to the upper hierarchy to be audible. For example, when the game screen has been switched back from the equipment edit screen to the character setting screen, the audio processer 37 turns down the volume of the BGM 3 and turns up the volume of the BGM 2, then the BGM 2 will be audible.

In this way, as the user accesses to the lower menu hierarchy, the number of sounds of the BGM increases so that stateliness of the BGM increases, then the user can find out that the user has accessed to the lower hierarchy by the sounds. For example, when the user accesses to the lower menu hierarchy as closer to the menu screen displaying the game start icon, the number of sounds increases so that the user can be liven up. When the menu screen has been switched, the user does not feel uncomfortable because the user hears the same piece of music (each BGM) continuously with increasing the number of sounds not from the beginning.

In one embodiment disclosed above, the number of sounds is gradually increased as the menu hierarchy lowers. However, the number of sounds may be gradually decreased as the menu hierarchy lowers. For example, on a result screen between game stages or after the game, the audio processer 37 causes the BGM with larger number of sounds to be audible. As the result screen has switched to the next page by the user's operation, the audio processer 37 will switch the BGM with smaller number of sounds to be audible. As the menu hierarchy lowers, the number of sounds may be set increasing or decreasing depending on the game or menu structure. The game start icon can be set in the highest hierarchy or the lowest hierarchy.

When changing pitch of the BGM during outputting, the audio processer 37 changes pitch of all of the BGM including the BGM turned down its volume. In this way, even the audible BGM is switched, it is natural for user. After the user changes the volume of the BGM, the audio processer 37 changes the volume of the BGM to be switched to be audible at the same volume level as the BGM that used to be audible.

A plurality of BGM to be switched includes not only the same piece of music with different number of sounds but also the same piece of music with different arrangement.

In one embodiment explained above, the audio processer 37 turns up the volume of the BGM 1 out of the BGM 1, 2, and 3 being the same piece of music performed with different number of sounds. After that, the audio processer 37 mutes the BGM 2 and 3 during calling the BGM 1, 2, and 3 at the same time. In response to the change of the menu screen, the audio processer 37 mutes the BGM 1 and turns up the volume of one of the muted BGM 2 or 3. As the result, in response to the change of the menu screen, it is possible to diversify the BGM easily. The BGM will be switched naturally without incongruity in the volume, because the BGM 1, 2, and 3 are the same piece of music adjusted at the same volume level.

Embodiment 2

In embodiment 2, it will be described one embodiment that different sounds corresponding to the items selected on the menu will be added to the BGM. As it is set as table 1 described below, a plurality of performance parts is set for each menu hierarchy. On the table 1, menu hierarchies are described in the first row and each instrument of the plurality of performance part included in the BGM is on each cell in vertical column of each menu hierarchy in the first row. As lowering the menu hierarchy (left to right on the table 1), the plurality of performance parts is added to the BGM. In other word, The BGM being performed with one performance part on the main menu, two performance parts on the submenu A, three performance parts on the submenu B, and four performance parts on the submenu C will be audible.

TABLE 1

| Main menu | Submenu A | Submenu B | Submenu C |
|---|---|---|---|
| Bass | Oboe | Cello | Horn |
| | Flute | Contrabass | Trumpet |
| | Clarinet | Violin | Trombone |
| | Woodwind instrument | String instrument | Brass instrument |

In the embodiment 2, the audio processer 37 sets the plurality of performance parts for each menu hierarchy and determines the performance parts to be added in response to the selected menu hierarchy. For example, when the user selects the second icon on the main menu, the BGM performed with basses and flutes will be audible in the hierarchy of the submenu A (on the submenu A), instead of the BGM performed with basses (the BGM being audible on the main menu). After that, when the user selects the first icon on the submenu A, the BGM performed with basses, flutes, and cellos will be audible in the hierarchy of the submenu B (on the submenu B), instead of the BGM performed with basses and flutes (the BGM being audible on the submenu A). In other example, when the user selects the first icon on the main menu, the BGM performed with basses and oboes will be audible in the hierarchy of the submenu A (on the submenu A). After that, when the user selects the third icon on the submenu A, the BGM performed with basses, oboes, and violins will be audible in the hierarchy of the submenu B (on the submenu B), Every combination of the BGM possibly played back is previously stored on the storage 34. The audio processer 37 simultaneously calls all BGM when the main menu is displayed. The 40 combinations (1+1*3+1*3*3+1*3*3*3) of the BGM are previously stored on the storage 34.

As in one embodiment on the table 1, the 40 combinations of the BGM are the same piece of music performed with basses in the hierarchy of the main menu, basses and oboes, basses and flutes, and basses and clarinets in the hierarchy of the submenu A, and basses, oboes, and cellos, basses, oboes, and contrabasses . . . in the hierarchy of the submenu B . . . etc. The audio processer 37 simultaneously calls all of the 40 combinations of the BGM and mutes the volume of all of the BGM except for the BGM performed with basses on the main menu. The audio processer 37 determines the audible BGM corresponding to the menu icon selected by the user. The method to switch the audible BGM is as explained in the embodiment 1.

As described above, in one embodiment of the present invention, a class of sounds included in the BGM in each menu hierarchy level is previously determined. The audio processer 37 determines the BGM to be audible in response to the selection by the user. As the result, BGM on each menu screen can be verified. The user can find out in which menu hierarchy the user is by newly hearing performance part, because the class of sounds included in the BGM in each menu hierarchy level is different.

In one embodiment according to the present invention, BGM possibly played back is previously stored on the storage 34, and the audio processer 37 simultaneously plays back all BGM. Therefore, it is possible to reduce such processing load as timing synchronization and BGM generation by the audio processer 37 to a minimum when switching the audible BGM. After the menu is switched, The BGM that will not be played back may be stopped playback. This makes possible to further reduce processing load.

INDUSTRIAL APPLICABILITY

As described above, according to one embodiment of the present invention enable the game device to diversify the BGM easily.

REFERENCE SIGNS LIST

1 game program
3 game device
30 bus
31 CPU
32 RAM
33 ROM
34 storage
35 GPU
36 inputting interface
37 audio processer
38 wireless communicating unit
39 media interface
40 touch screen
41 speaker

The invention claimed is:
1. A game device comprising:
 a music storage unit storing a plurality of music tracks being the same piece of music performed in an individual combination of various sounds, the plurality of music tracks including first and second music tracks;
 a music playback unit simultaneously starting playback of the plurality of music tracks with volumes thereof being muted except for the first music track; and
 a switch unit switching music tracks according to a menu item selected by a user by turning down the volume of the first music track and turning up the volume of the second music track, wherein
 each music track includes performance parts increased in number as a menu hierarchy level lowers, and
 the performance parts are played by musical instruments of the same group in the same menu hierarchy level and are respectively added according to the menu item selected by the user.
2. A method comprising:
 a music playback step simultaneously starting playback of a plurality of music tracks, which include first and second music tracks, with volumes thereof being muted except for the first music track, the plurality of music tracks being the same piece of music performed in an individual combination of various sounds; and
 a switch step switching music tracks according to a menu item selected by a user by turning down the volume of the first music track and turning up the volume of the second music track, wherein
 each music track includes performance parts increased in number as a menu hierarchy level lowers, and
 the performance parts are played by musical instruments of the same group in the same menu hierarchy level and are respectively added according to the menu item selected by the user.

3. A non-transitory computer-readable storage medium storing a program for causing a computer to execute:
- a music playback process simultaneously starting playback of a plurality of music tracks, which includes first and second music tracks, with volumes thereof being muted except for the first music track, the plurality of music tracks being the same piece of music performed in an individual combination of various sounds; and
- a switch process switching music tracks according to a menu item selected by a user by turning down the volume of the first music track and turning up the volume of the second music track, wherein
- each music track includes performance parts increased in number as a menu hierarchy level lowers, and
- the performance parts are played by musical instruments of the same group in the same menu hierarchy level and are respectively added according to the menu item selected by the user.

\* \* \* \* \*